March 24, 1970  H. H. BRIDGFORD  3,502,488
COMBINED FROZEN DOUGH PACKAGE AND BAKING CONTAINER
Filed July 25, 1968  3 Sheets-Sheet 1

INVENTOR.
HUGH H. BRIDGFORD
BY
ATTORNEY

March 24, 1970     H. H. BRIDGFORD     3,502,488
COMBINED FROZEN DOUGH PACKAGE AND BAKING CONTAINER
Filed July 25, 1968     3 Sheets-Sheet 2

INVENTOR.
HUGH H. BRIDGFORD
BY

ATTORNEY

March 24, 1970   H. H. BRIDGFORD   3,502,488
COMBINED FROZEN DOUGH PACKAGE AND BAKING CONTAINER
Filed July 25, 1968   3 Sheets-Sheet 3

INVENTOR.
HUGH H. BRIDGFORD
BY
ATTORNEY

United States Patent Office 3,502,488
Patented Mar. 24, 1970

3,502,488
COMBINED FROZEN DOUGH PACKAGE AND
BAKING CONTAINER
Hugh H. Bridgford, 5415 Bergerline Ave.,
West New York, N.J. 07093
Filed July 25, 1968, Ser. No. 754,131
Int. Cl. B65b 25/16
U.S. Cl. 99—172                                    6 Claims

ABSTRACT OF THE DISCLOSURE

A frozen yeast-containing, developed dough fills a shallow aluminum lined cardboard rectangular carton having upper closure walls which are swingable to a position projecting upwardly from the carton peripheral walls. The dough filled carton is stored in a frozen state and in use the dough-containing carton is stored at room temperature to thaw and effect the raising of the dough, the rising dough swinging the closure walls to open extended positions, and the raised dough then being baked in the opened carton.

BACKGROUND OF THE INVENTION

The present invention relates generally to an improved method and device for the production of baked products and it relates particularly to an improved method and device for the storage of prepared dough and the raising and baking thereof.

It has been a common practice to store and dispense dough in a frozen, packaged, prepared state. The dough is generally removed from the package, thawed, and then baked or otherwise treated and handled. The conventional methods and articles employed in the storing and baking of frozen dough possess numerous drawbacks and disadvantages. They necessitate the use of many implements and devices and frequently are time consuming and require considerable skill. In addition, handling and manipulating of the dough is required and these procedures otherwise leave much to be desired.

SUMMARY OF THE INVENTION

It is a principal object of the present invention to provide an improved method and article for the production of bakery products.

Another object of the present invention is to provide an improved method and article for the production of yeast-raised baked products.

Still another object of the present invention is to provide an improved method and article for the storage of a prepared yeast-containing dough and for the raising and baking of the dough.

A further object of the present invention is to provide a method and article of the above nature characterized in their simplicity, reliability, adaptability, versatility and efficiency.

The above and other objects of the present invention will become apparent from a reading of the following description taken in conjunction with the accompanying drawings which illustrate preferred embodiments thereof.

In a sense the present invention contemplates the provision of the method of producing a yeast-raised baking product comprising storing a frozen, unraised, developed yeast-containing dough in a closed baking receptacle, removing said dough together with said receptacle from a frozen environment for a period of time sufficient to thaw and effect the raising of said dough, and baking said raised dough in said receptacle, but in an open condition thereof.

The improved article for practicing the present method comprises a baking receptacle including a peripheral wall and closure means movable between a position closing the top of the receptacle and an open position projecting upwardly of said peripheral wall, and a frozen yeast-containing, unraised, developed, dough packaged in said closed receptacle.

In its preferred form the improved article is of rectangular configuration and is formed of aluminum lined cardboard, the aluminum lining being on the inside of the receptacle. The receptacle is closed at its top by walls extending from the upper edges of the receptacle front, rear and side walls and swingable to an edge closed, restricted upwardly projecting position under the motive influence of the rising dough. In one form the extension walls are connected by fold lines along their adjacent edges and these extension walls are provided with gussets to permit the closing of the receptacle by the extension walls. In another form the extension walls are separated at their edges and the front and rear extension walls are provided with inwardly directed end flaps which engage the receptacle side walls outer faces when in closed position and the side wall extension outer faces when in open position. The closed sealed receptacle is advantageously filled with the frozen dough which, when in its optimum raised condition projects a short distance above the open extended receptacle walls.

The improved method and articles avoid the drawbacks and disadvantages of the conventional methods and articles for storing frozen dough and preparing the finished baked product therefrom. By employing the present method and article, the frozen package is merely removed from a frozen environment, and then stored at normal room temperature until the dough is raised, the rising dough itself opening the top of the receptacle, and the raised dough-containing receptacle is then placed in the oven to effect the baking.

The procedure is most convenient and substantially fool-proof, requiring no skill whatsoever, and the need for any implements or devices, and the handling or shaping of the dough is completely obviated.

DESCRIPTION OF THE PREFERRED EMBODIMENTS

Figure 1:
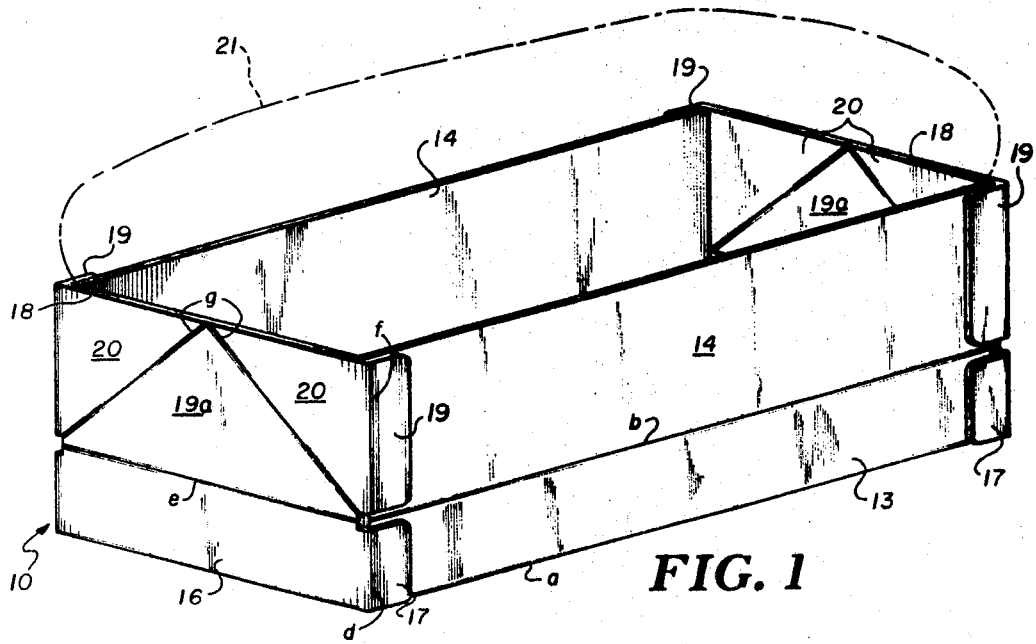
FIGURE 1 is a front persepctive view of an article embodying the present invention, the receptacle being illustrated in an open condition and the dough shown by broken lines in a raised state.
Figure 2:
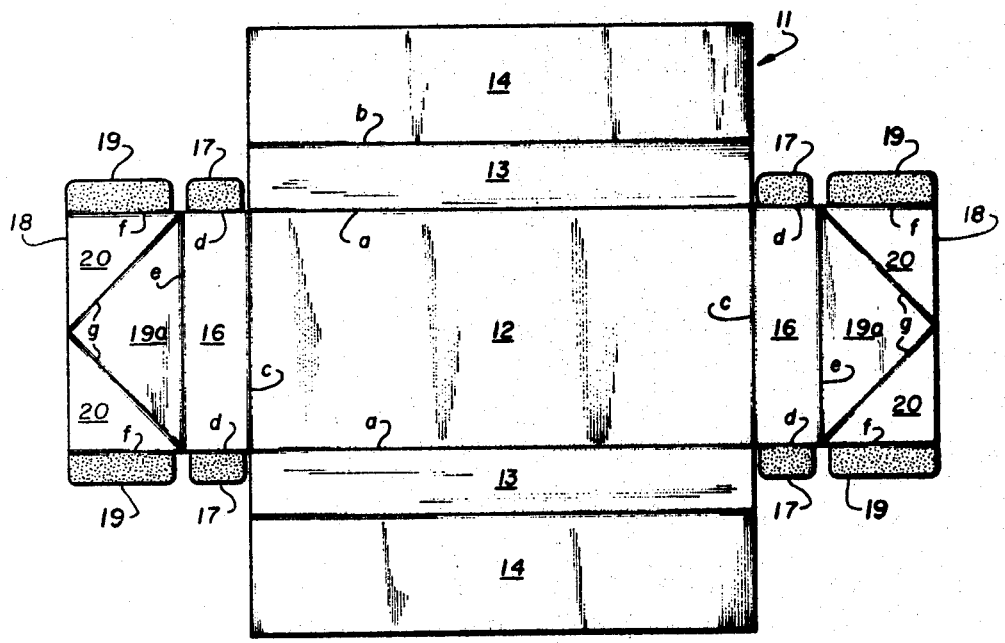
FIGURE 2 is a plan view of the lay flat blank forming the receptacle.

Referring now to the drawings and particularly FIGURES 1 to 4 thereof which illustrate a preferred embodiment of the article of the present invention, the reference numeral 10 generally designates the improved baking receptacle and storage carton which is formed from a unitary blank 11. The blank 11 advantageously consists of an outerface or layer of cardboard and an adherent inner face or layer of aluminum foil. For example, the cardboard layer may be of the solid bleached sulphate type having a weight of about 203 pounds per ream and the aluminum foil may have a thickness of about .0003 inch and a weight of 12½ pounds ream weight.

The blank 11 includes a rectangular bottom wall panel 12, along the long edges of which extend shallow front and rear wall panels 13 delineated from panel 12 by fold lines a. Extending from the outer edges of panels 13, and delineated therefrom by fold lines b are coextensive front and rear extension and closure wall defining rectangular panels 14, each having a depth about one half that of panel 12. Side wall defining rectangular panels 16 extend from the side edges of panel 12 and are delineated therefrom by fold lines c, and are provided with outwardly projecting end tabs 17 delineated from panel 16 by fold lines d and having adhesive coatings on their inner faces.

Extending from the outer edges of panels 16 are extension end wall defining rectangular panels 18 delineated from the panel 16 by fold lines e, and being of about the same heights as panels 14. Rectangular sealing tabs 40 project from opposite end edges of panel 18 and are delineated therefrom by fold lines f, the tabs 40 having adhesive coatings on their inner faces. Fold lines g are formed in each panel 18 from the inner corners thereof to the medial point on its outer edge to delineate with fold line e, a triangular gusset section 19a which permits the inner collapsing of the extension walls, as will be hereinafter described, and triangular side panel sections 20.

In assembling the receptacle 10, the panels 13 and 14 and 16 and 18 are folded perpendicular to panel 12 and the tabs 17 are glued to the outer end faces of panels 13 and the tabs 40 are glued to the outer end faces of panels 14 by means of the adhesive coatings on the tabs to complete the upper box with the aluminum layer facing inwardly.

The receptacle 10 is filled to about the upper edges of walls 13 and 16 with a developed yeast dough in an unraised condition, that is in which the gluten in the dough has been developed to its optimum viable state by kneading in the known manner. The yeast-containing dough may be of any conventional composition and prepared in any suitable manner either by a batch or continuous process. It may be a bread dough or a yeast raised cake dough and may include any of the usual ingredients and additives. The dough may be singly kneaded or may be successively kneaded with intervening rising periods but is packaged in the receptacle 10 in its developed, unraised state.

Figure 3:
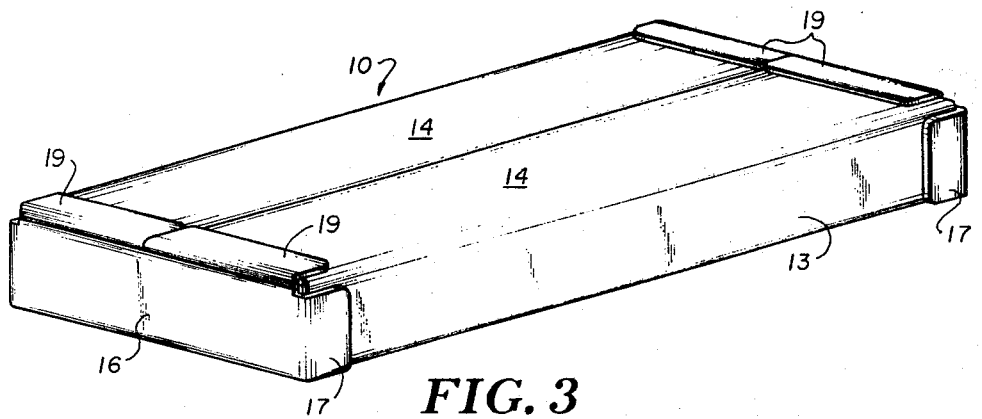
FIGURE 3 is a front perspective view of the fully closed receptacle, the dough being frozen and accordingly compacted.
Figure 4:
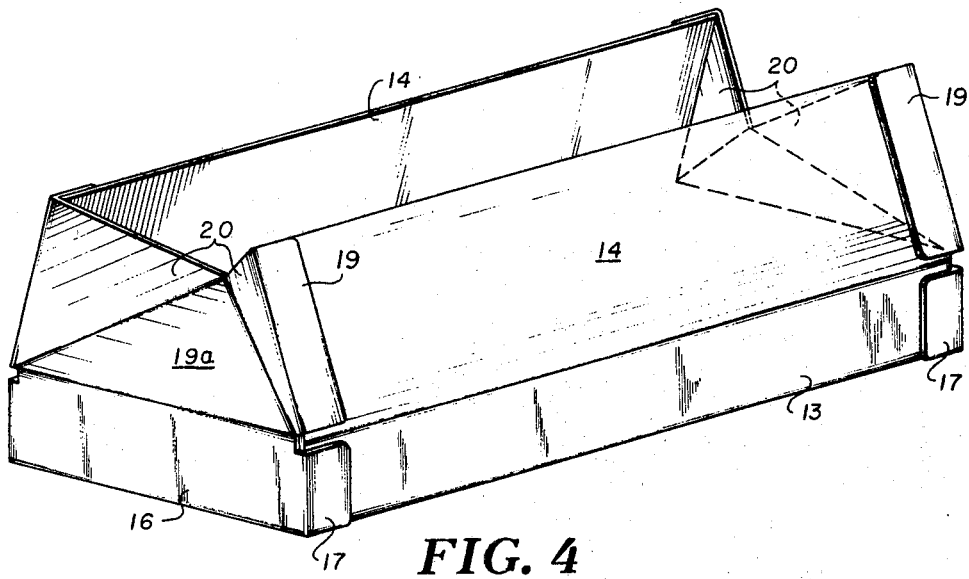
FIGURE 4 is a front perspective view of the receptacle in a partially open condition.

The receptacle 10 is then closed by folding the gussets 19a inwardly as shown in FIGURE 4 and swinging the panels 14 to horizontal closed positions, as shown in FIGURE 3, the gussets 19a assuming horizontal positions with the corresponding panel sections 20 being sandwiched between panels 14 and gussets 19a. In the closed condition the free edges of closure panels 14 are substantially contiguous along their full lengths.

The dough-containing closed package is then promptly enclosed in any suitable outer wrapper, cellophane for example, and is deep frozen. The product is thus storaged at conventional deep freeze temperatures which will deactivate the yeast and prevent any deterioration of the dough.

In preparing the baked product, the outer wrapper (not shown) is removed and the dough containing receptacle is stored at room temperature or slightly higher, preferably at about the optimum yeast activity temperature, until the dough 21 rises to the desired volume, for example as shown by broken lines in FIGURE 1. As the dough 21 rises, it per se raises the extension walls 14 and 18 to their erected positions, as shown in FIGURE 1, the walls 14 and 18 being restricted from further outward movement and confining the rising dough to the desired space. When the dough 21 has risen to the desired volume, the dough-containing receptacle 10, which functions as a baking pan, is placed in an oven and the dough then baked under conventional conditions.

Figure 5:
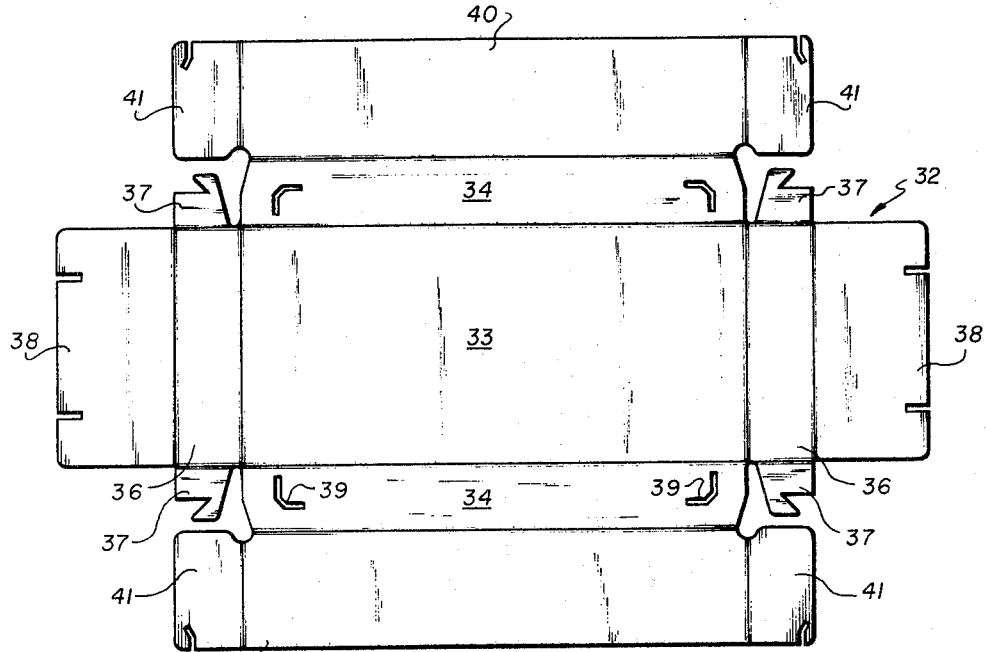
FIGURE 5 is a plan view of a lay flat blank forming a receptacle of another embodiment of the present invention.
Figure 6:
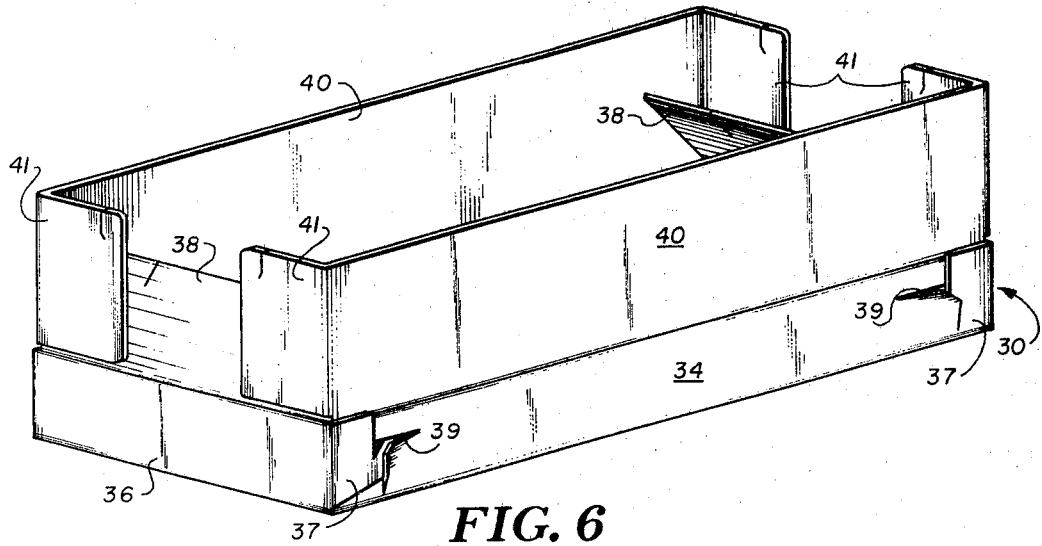
FIGURE 6 is a front perspective view thereof in an assembled open condition.

In FIGURES 5 and 6 there is illustrated a modified receptacle structure which may be advantageously employed instead of the receptacle 10. Specifically the receptacle 30 is formed of a unitary blank 32 of aluminum faced cardboard including a rectangular base panel 33 provided along its longitudinal edges with front and rear wall panels 34 and along its transverse edges with end wall panels 36 which are delineated from base panel 33 by fold lines. Projecting laterally from opposite edges of each side wall panel 36 and delineated therefrom by fold lines are hook shaped locking tabs 37, the hooked edges thereof being outwardly longitudinally directed. A rectangular side wall extension panel 38 extends from the outer edge of each side wall panel 36 and is delineated therefrom by a fold line. L-shaped locking tab engaging slots 39 are formed in the wall panels 34 proximate their side edges and include outer longitudinal legs directed toward each other and perpendicular inwardly directed transverse legs.

Rectangular front and rear wall extension panels 40 project from the outer edges of wall panels 34 and are delineated therefrom by fold lines. Projecting from the opposite outer edges of extension panels 40 are inwardly directed rectangular tabs 41 which are perpendicular to the respective extension panels 40. The depths of the panels 40 are each about half of that of the base panel 33 and the widths of the tabs 41 are about equal to the depths of side wall panels 36.

In erecting and assembling the receptacle 30, wall panels 34 and 36 are swung inwardly along the respective fold lines and the locking tabs 37 are inserted into locking engagement with the corresponding slots 39 through the outer wall faces as shown in FIGURE 6. The receptacle is then filled to the upper edges of walls 34 and 36 with an unraised, developed, yeast-containing dough and the panels 38 are folded downwardly over the dough and the panels 40 then swung to a closed position about respective fold lines, the tabs 41 being brought into superimposition with the outer faces of side walls 36. The closed receptacle is enclosed in an outer wrapper and deep frozen, and the product is so stored until used.

The method of using the product last described is similar to that first described. The rising of the dough automatically effects the opening of the extension panels 38 and 40, the tabs 41 functioning to restrict the amount of outward movement thereof and delineating a peripherally confined space.

While there have been described and illustrated preferred embodiments of the present invention, it is apparent that numerous alterations, omissions and additions may be made without departing from the spirit thereof.

Of course, the panels may be made of heavier weight paper to strengthen them, or may comprise more thicknesses, as is obvious, so that the sidewalls will be as strong as desired and the baked loaf will then have a more desirable shape.

What is claimed is:

1. A baking product preparation and storage article comprising a baking receptacle including a vertical peripheral wall, closure means movable between a position overlying and closing the top of the receptacle, and an open position projecting upwardly of said peripheral wall, and a frozen, yeast containing, unraised, developed dough in said receptacle when in closed position, said closure means comprising a pair of panels each hinged to respectively opposite sides of said peripheral wall and each having substantially centrally disposed free edges which are contiguous to each other prior to opening of said receptacle whereby said dough is substantially completely coverd by said panels when the dough is frozen, and said dough when permitted to thaw and to rise presses constantly against said panels to raise said panels while being constantly pressed against by said panels while said panels are being thus raised.

2. The article of claim 1 and wherein said closure means panels are each movable between a horizontal, closed disposition when the dough is frozen, to an open position when the dough is thawed and has risen, and said penels being then vertical and substantially coplanar with said peripheral wall.

3. The article of claim 2 and wherein said receptacle includes a rectangular bottom wall, and said closure means panels are parallel to and co-extensive with said bottom wall in the closed position of said receptacle.

4. The article of claim 3 and wherein said frozen dough substantially fills said receptacle when in said closed position, and when thawed and raised projects above the upper edges of the peripheral wall and said panels which are coplanar therewith.

5. The article of claim 4 and wherein said peripheral wall includes rectangular front, rear, and side walls projecting upwardly from the edges of said bottom wall, and said closure means panels comprise extension walls hinged to the upper edges of said front, rear, and side walls, and movable by the pressure of the thawing and rising dough between a position parallel to said bottom wall where they close said receptacle and an open vertical position substantially coplanar with said receptacle front, rear, and side walls.

6. The article of claim 5 and wherein said extension walls are joined at their hinged edges along fold lines, said side wall extensions having fold lines formed therein extending from the lower corners thereof to delineate inwardly foldable gussets.

References Cited

UNITED STATES PATENTS

| 2,381,067 | 8/1945 | Lowey | 229—33 |
| 2,545,802 | 3/1951 | Bergstein | 229—33 X |
| 2,732,995 | 1/1956 | Geisler et al. | 229—33 |
| 3,346,399 | 10/1967 | Watson et al. | 99—172 |

TIM R. MILES, Primary Examiner

U.S. Cl. X.R.

229—33, 36